US012043317B2

(12) United States Patent  
Ebisumoto et al.

(10) Patent No.: US 12,043,317 B2
(45) Date of Patent: Jul. 23, 2024

(54) LOWER VEHICLE-BODY STRUCTURE OF VEHICLE

(71) Applicant: Mazda Motor Corporation, Hiroshima (JP)

(72) Inventors: Keisuke Ebisumoto, Hiroshima (JP); Hirotaka Natsume, Hiroshima (JP); Ippei Kuroda, Hiroshima (JP); Shunsuke Hirai, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 276 days.

(21) Appl. No.: 17/719,378

(22) Filed: Apr. 13, 2022

(65) Prior Publication Data

US 2022/0348267 A1 Nov. 3, 2022

(30) Foreign Application Priority Data

Apr. 30, 2021 (JP) .................. 2021-077945

(51) Int. Cl.
*B62D 25/20* (2006.01)
*B62D 21/15* (2006.01)
*B62D 25/08* (2006.01)

(52) U.S. Cl.
CPC ............ *B62D 25/20* (2013.01); *B62D 21/157* (2013.01); *B62D 25/08* (2013.01); *B62D 25/2018* (2013.01)

(58) Field of Classification Search
CPC .. B62D 25/20; B62D 25/2018; B62D 21/157; B62D 25/08

USPC ....................................... 296/193.07
See application file for complete search history.

(56) References Cited

U.S. PATENT DOCUMENTS

| | | | |
|---|---|---|---|
| 8,292,356 B2* | 10/2012 | Ishigame | B60N 2/005 296/193.07 |
| 10,494,035 B2* | 12/2019 | Abe | B62D 25/025 |
| 2019/0217891 A1 | 7/2019 | Natsume et al. | |
| 2021/0070371 A1 | 3/2021 | Ebisumoto et al. | |

FOREIGN PATENT DOCUMENTS

| | | |
|---|---|---|
| CN | 110040186 A | 7/2019 |
| CN | 111434569 A | 7/2020 |
| CN | 112477998 A | 3/2021 |
| JP | 2004359125 A | 12/2004 |
| JP | 2009-286331 A | 12/2009 |
| JP | 2015178312 A | 10/2015 |

* cited by examiner

*Primary Examiner* — Amy R Weisberg
*Assistant Examiner* — Dana D Ivey
(74) *Attorney, Agent, or Firm* — XSENSUS LLP

(57) ABSTRACT

A lower vehicle-body structure of a vehicle may include: a floor panel; a raised wall portion; a cross member that is disposed on an upper face of the floor panel and extends in the vehicle width direction; a frame member including: an inclined portion that is disposed so as to form a closed cross-section with the floor panel on a vehicle-width-direction outer side of the raised wall portion on the upper face of the floor panel and a connector connected to the cross member at a rear end of the inclined portion; and a coupler that is disposed on the floor panel at a place on a vehicle front side of the connection portion and couples the inclined portion and the raised wall portion to each other in the vehicle width direction.

14 Claims, 7 Drawing Sheets

LOWER VEHICLE-BODY STRUCTURE OF VEHICLE

CROSS-REFERENCE TO RELATED APPLICATION

The present application claims priority to Japanese patent application JP 2021-077945, filed Apr. 30, 2021, the entire contents of which being incorporated herein by reference in its entirety.

TECHNICAL FIELD

The present disclosure relates to a lower vehicle-body structure of a vehicle.

BACKGROUND ART

In Patent Literature 1, a lower vehicle-body structure including a frame having an inclined portion that is inclined to the vehicle-width-direction outer side as the inclined portion approaches the vehicle rear side is disclosed. The frame is connected to a cross member that extends in the vehicle width direction at a rear end portion of the inclined portion.

CITATION LIST

Patent Literature

[Patent Literature 1] Japanese Patent Laid-Open. No. 2009-286331

SUMMARY

Problems to be Solved

In the frame member having the inclined portion, an inward falling deformation in which the inclined portion falls toward the vehicle-width-direction inner side by pivoting about the rear end portion of the inclined portion connected to the cross member easily occurs at the time of an offset collision in which a collision load is input to a position offset from a central portion in the vehicle width direction from the vehicle front side. As a result, the retreat of a dash panel may occur.

Thus, an object of some embodiments of the present disclosure is to provide a lower vehicle-body structure of a vehicle capable of suppressing an inward falling deformation of an inclined portion in an offset collision in a frame member having the inclined portion.

Means for Solving the Problem

In order to solve the abovementioned problem, the present disclosure is characterized by the following configurations.

First, some embodiments of the disclosure according to claim 1 of the present application provide a lower vehicle-body structure of a vehicle, the lower vehicle-body structure characterized by including:
  a floor panel configured as a floor of the vehicle;
  a raised wall portion that is disposed in vicinity of a central portion of the floor panel in a vehicle width direction and provided in a protruding manner along a vehicle front-rear direction;
  a cross member that is disposed on an upper face of the floor panel and extends in the vehicle width direction;
  a frame member including:
    an inclined portion that is disposed so as to form a closed cross-section with the floor panel on a vehicle-width-direction outer side of the raised wall portion on the upper face of the floor panel, the inclined portion being inclined toward the vehicle-width-direction outer side as the inclined portion approaches a vehicle rear side; and
    a connection portion or connector connected to the cross member at a rear end of the inclined portion; and
  a coupling member or coupler that is disposed on the floor panel at a place on a vehicle front side of the connection portion and couples the inclined portion and the raised wall portion to each other in the vehicle width direction.

According to some embodiments of the present disclosure, each of the frame members has the inclined portion that is inclined toward the vehicle-width-direction outer side as the inclined portion approaches the vehicle rear side. Therefore, at the time of an offset collision in which a collision load is input to a position offset from the central portion in the vehicle width direction from the vehicle front side, an inward falling deformation in which the inclined portion positioned on the rear side falls toward the vehicle-width-direction inner side by pivoting about the connection portion connected to the cross member easily occurs. However, in some embodiments of the present disclosure, the coupling member that couples the inclined portion of the frame member and the raised wall portion to each other in the vehicle width direction is included. Therefore, the coupling member resists the abovementioned inward falling deformation in a supporting manner, and hence the inward falling deformation of the frame member is suppressed.

The coupling member may extend in a direction orthogonal to an extending direction of the inclined portion of the frame member when seen from an upper face of the vehicle.

With this configuration, the coupling member extends in a direction orthogonal to the inclined portion of the frame member. Therefore, it is easy for the coupling member to exhibit a force that resists the inward falling deformation of the frame member, which falls in a direction orthogonal to the inclined portion, in a supporting manner in a more suitable manner.

A tunnel portion that protrudes toward an upper side of the vehicle may be disposed on the central portion of the floor panel in the vehicle width direction, and
  the raised wall portion may be composed of a side portion of the tunnel portion in the vehicle width direction.

With this configuration, the raised wall portion is composed of the side portion of the tunnel portion in the vehicle width direction in the central portion of the floor panel in the vehicle width direction for the vehicle including the tunnel portion for covering a transmission and the like of the vehicle. Accordingly, the coupling member couples the inclined portion of the frame member and the raised wall portion to each other, which generates a force that resists the inward falling deformation of the frame member in a supporting manner so that the inward falling deformation of the frame member can be suppressed.

A tunnel side frame that forms a closed cross-section with the raised wall portion and the floor panel and extends in the vehicle front-rear direction may be disposed on the side portion of the tunnel portion in the vehicle width direction.

With this configuration, the raised wall portion forms the closed cross-section with the tunnel side frame, and hence the rigidity of the raised wall portion increases. Therefore, by coupling the raised wall portion of which rigidity is increased and the inclined portion of the frame member to each other by the coupling member, a force that resists the inward falling deformation of the frame member in a supporting manner can be exhibited in a more suitable manner.

A backbone frame that extends in the vehicle front-rear direction may be disposed on an upper portion of the tunnel portion on a vehicle-width-direction end portion side of the tunnel portion, a rising portion that extends upward may be provided on the coupling member on the vehicle-width-direction inner side of the coupling member, and the rising portion may be coupled to the backbone frame.

With this configuration, the rising portion of the coupling member is coupled to the backbone frame of the tunnel portion. By the rising portion of the coupling member, the out-of-plane deformation in the side wall of the tunnel portion is suppressed, and the deformation of the tunnel portion in the vehicle width direction that looks like a matchbox is crushed (also referred to as a rhombic deformation) that occurs due to vibration at the time of vehicle traveling is suppressed.

At least one bead that extends in an up-down direction may be provided in the rising portion of the coupling member.

With this configuration, the rigidity of the rising portion of the coupling member increases because the rising portion includes the bead. Therefore, by the rising portion of the coupling member of which rigidity is increased, the out-of-plane deformation of the tunnel portion can be further suppressed.

At least two of the beads may be provided in the rising portion of the coupling member, and the rising portion may have a horizontal-direction cross-sectional shape that is formed in a substantially W-like shape by the at least two beads.

With this configuration, the rigidity of the rising portion of the coupling member further increases because the rising portion includes two beads. Therefore, by the rising portion of the coupling member of which rigidity is further increased, the out-of-plane deformation of the tunnel portion can be suppressed even more.

The coupling member may include:

a horizontal portion that is disposed on the upper face of the floor panel and extends in the vehicle width direction; and a slope portion that extends in a direction that is inclined upward as the slope portion approaches the vehicle-width-direction inner side between the rising portion and the horizontal portion.

With this configuration, the slope portion acts in a bracing form between the floor panel and the side portion of the tunnel portion, and hence the rhombic deformation of the tunnel portion that occurs due to the vibration at the time of the vehicle traveling can be further suppressed.

A front frame that extends to the vehicle front side may be connected to a front end of the inclined portion of the frame member, a dash cross member that extends in the vehicle width direction may be disposed on a front end of the floor panel, and a reinforcement member that couples the front frame and the dash cross member to each other may be disposed on a rear end of the front frame on a vehicle-width-direction inner side of the rear end.

The front frame is connected to the front end of the frame member having the inclined portion that is inclined toward the vehicle-width-direction outer side as the front end approaches the vehicle rear side. Therefore, at the time of an offset collision in which the collision load is input to a position offset from the central portion in the vehicle width direction from the vehicle front side, an inward falling deformation in which the frame member and the front frame connected to the front end of the frame member fall toward the vehicle-width-direction inner side by pivoting about the connection portion at which the frame member is connected to the cross member easily occurs. However, according to this configuration, the reinforcement member couples the vehicle-width-direction inner side of the front frame and the dash cross member that extends in the vehicle width direction to each other. Therefore, the abovementioned inward falling deformation is easily resisted in a supporting manner, and the inward falling deformation of the front frame and the frame member is suppressed in an even easier manner.

Advantageous Effect of Disclosure

Therefore, according to the lower vehicle-body structure of the vehicle according to some embodiments of the present disclosure, the inward falling deformation of the inclined portion in the offset collision in the frame member having the inclined portion may be able to be suppressed.

BRIEF DESCRIPTION OF DRAWINGS

In order to explain the technical features of embodiments of the present disclosure more clearly, the drawings used in the present disclosure are briefly introduced as follow. Obviously, the drawings in the following description are some exemplary embodiments of the present disclosure. Ordinary person skilled in the art may obtain other drawings and features based on these disclosed drawings without inventive efforts.

MODE FOR CARRYING OUT THE DISCLOSURE

An embodiment of the present disclosure is described below with reference to the accompanying drawings.

Figure 1:
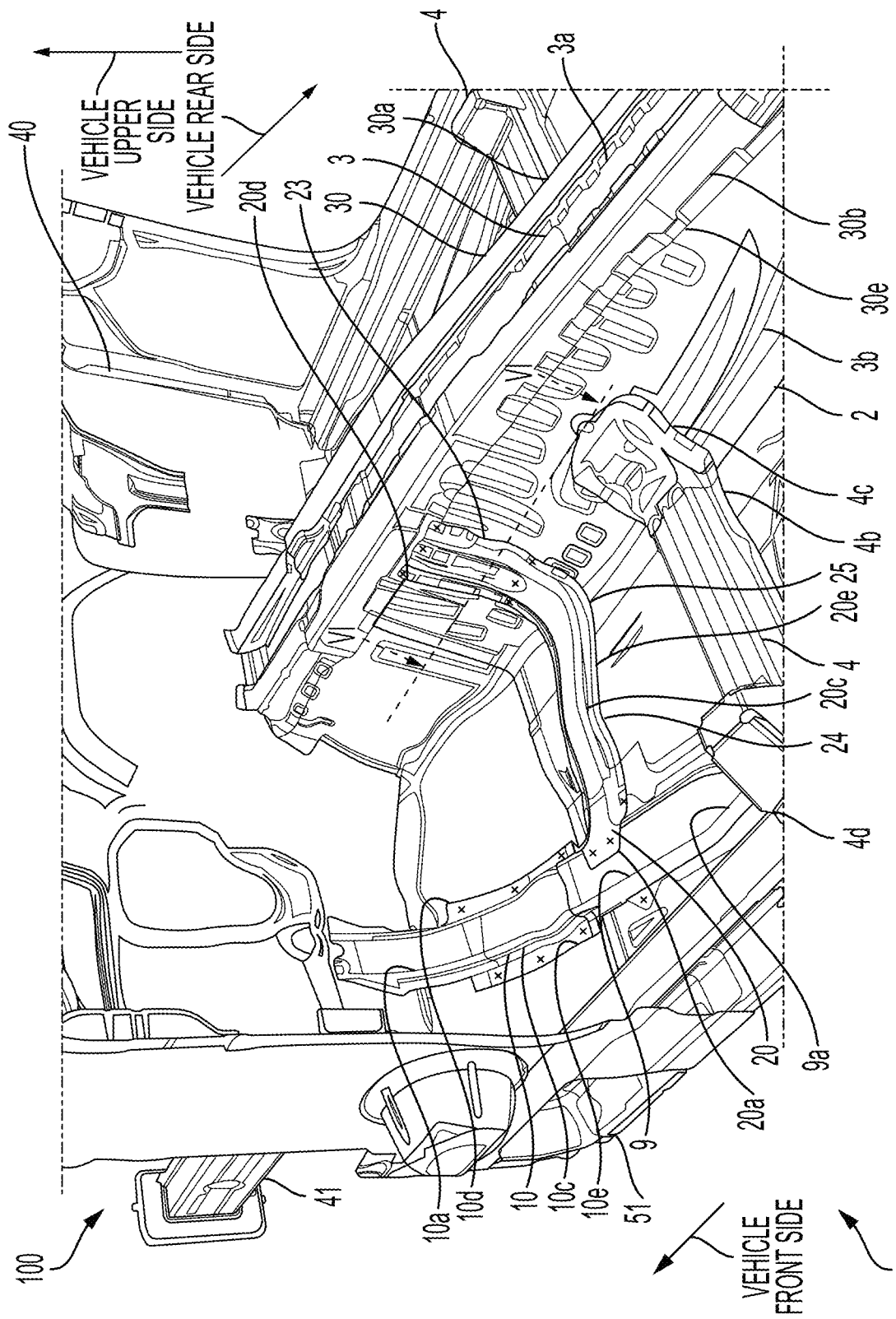
FIG. 1 is a schematic view illustrating a lower vehicle-body structure of a vehicle according to one embodiment of the present disclosure.

FIG. 1 is a schematic view illustrating a lower vehicle-body structure of a vehicle according to one embodiment of the present disclosure. As illustrated in FIG. 1, a lower vehicle-body structure 1 of a vehicle 100 includes a floor panel 2 configured as a floor, a dash panel 40 that is disposed on a front end of the floor panel 2 and has a raised wall shape that spreads to the vehicle width direction, and a pair of side sills 51 that is disposed on both of left and right ends of the floor panel 2 in the vehicle width direction and extends in the vehicle front-rear direction.

In the present embodiment, the vehicle 100 is a hybrid vehicle, and an engine and a motor serving as a driving source (not shown) are disposed in order on the vehicle front side of the dash panel 40 such that shaft centers thereof extend in the vehicle front-rear direction.

A transmission (not shown) connected to the engine and the motor serving as the driving source is disposed below a central portion of the floor panel 2 in the vehicle width direction such that a shaft center thereof extends in the vehicle front-rear direction. A tunnel portion 3 that protrudes toward the upper side of the vehicle is disposed on the central portion of the floor panel 2 in the vehicle width direction such that the transmission does not interfere with the floor panel 2. In the tunnel portion 3, a propeller shaft and an exhaust pipe (not shown) are also disposed.

Figure 2:
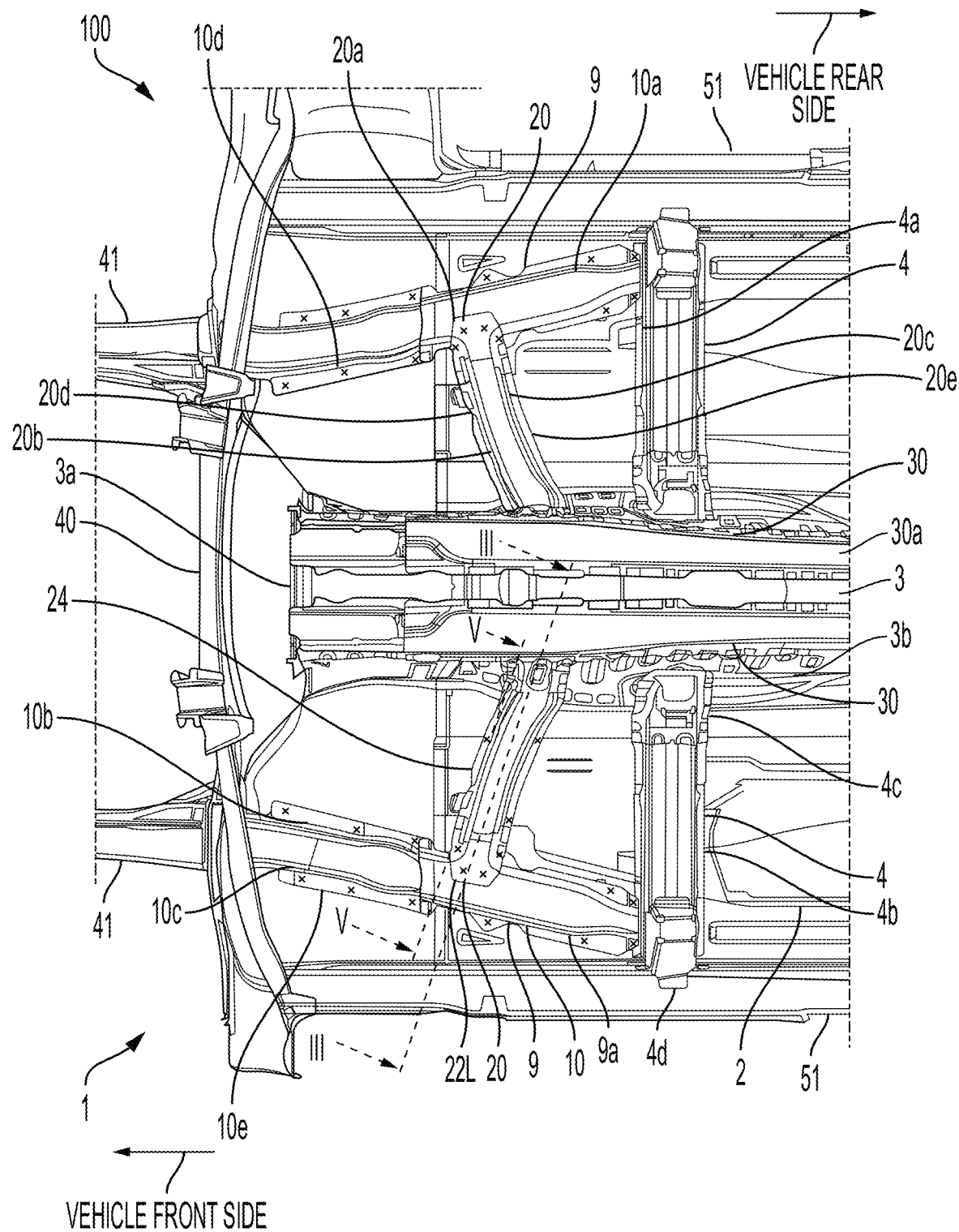
FIG. 2 is a schematic view of the lower vehicle-body structure in FIG. 1 seen from above according to one embodiment of the present disclosure.

FIG. 2 is a schematic view of the lower vehicle-body structure 1 in FIG. 1 seen from above. On an upper face of the floor panel 2, each of a pair of cross members 4 that extends in the vehicle width direction is disposed between each of the pair of side sills 51 and the tunnel portion 3. In other words, the pair of cross members 4 is disposed on both of left and right sides of the tunnel portion 3 in the vehicle width direction and is disposed in substantially same positions in the vehicle front-rear direction.

The cross member 4 is a pressed component made of a steel material, for example, and is formed to have a hat-like cross-sectional shape that opens downward in a cross-section orthogonal to the vehicle width direction. The cross member 4 has a front-side flange 4a that extends to the vehicle front side and a rear-side flange 4b that extends to the vehicle rear side on a lower end portion. The cross member 4 is joined to the floor panel 2 from above by spot welding, for example, at the front-side flange 4a and the rear-side flange 4b. Therefore, a closed cross-section (not shown) continuous in the vehicle width direction is formed between the cross member 4 and the floor panel 2.

Returning to FIG. 1, the tunnel portion 3 has an upper face portion 3a that extends in the vehicle front-rear direction in the center in the vehicle width direction, and a pair of raised wall portions 3b that extends downward from both side edge portions of the upper face portion 3a in the vehicle width direction and is connected to the floor panel 2. The pair of cross members 4 each has, on the vehicle-width-direction inner side, a raised wall mounting bracket 4c that extends upward as the raised wall mounting bracket 4c approaches the vehicle-width-direction inner side and has, on the vehicle-width-direction outer side, a connection member 4d that extends to the vehicle-width-direction outer side. In the present embodiment, the cross member 4 is joined to the raised wall portion 3b at the raised wall mounting bracket 4c by spot welding, for example, and is joined to an inner wall face of the side sill 51 at the connection member 4d by spot welding, for example.

Returning to FIG. 2, on the upper face of the floor panel 2, each of a pair of frame members 9 that extends in the vehicle front-rear direction is disposed between each of the pair of side sills 51 and the tunnel portion 3. In other words, each of the pair of frame members 9 is disposed on both sides of the tunnel portion 3 in the vehicle width direction. The frame member 9 includes an inclined portion 9a that extends in a direction inclined to the vehicle-width-direction outer side toward the rear side, and a rear-side extended portion 9b (see FIG. 4) that extends rearward in parallel to the vehicle front-rear direction so as to be continuous from a rear end portion of the inclined portion 9a. The inclined portion 9a has a front end portion continuous from a rear portion of the front frame 41, and terminates, at a rear end portion, in a vehicle-width-direction outer end portion of the cross member 4. The rear-side extended portion 9b is in abutment against a vehicle-width-direction inner wall face of the side sill 51.

Figure 3:
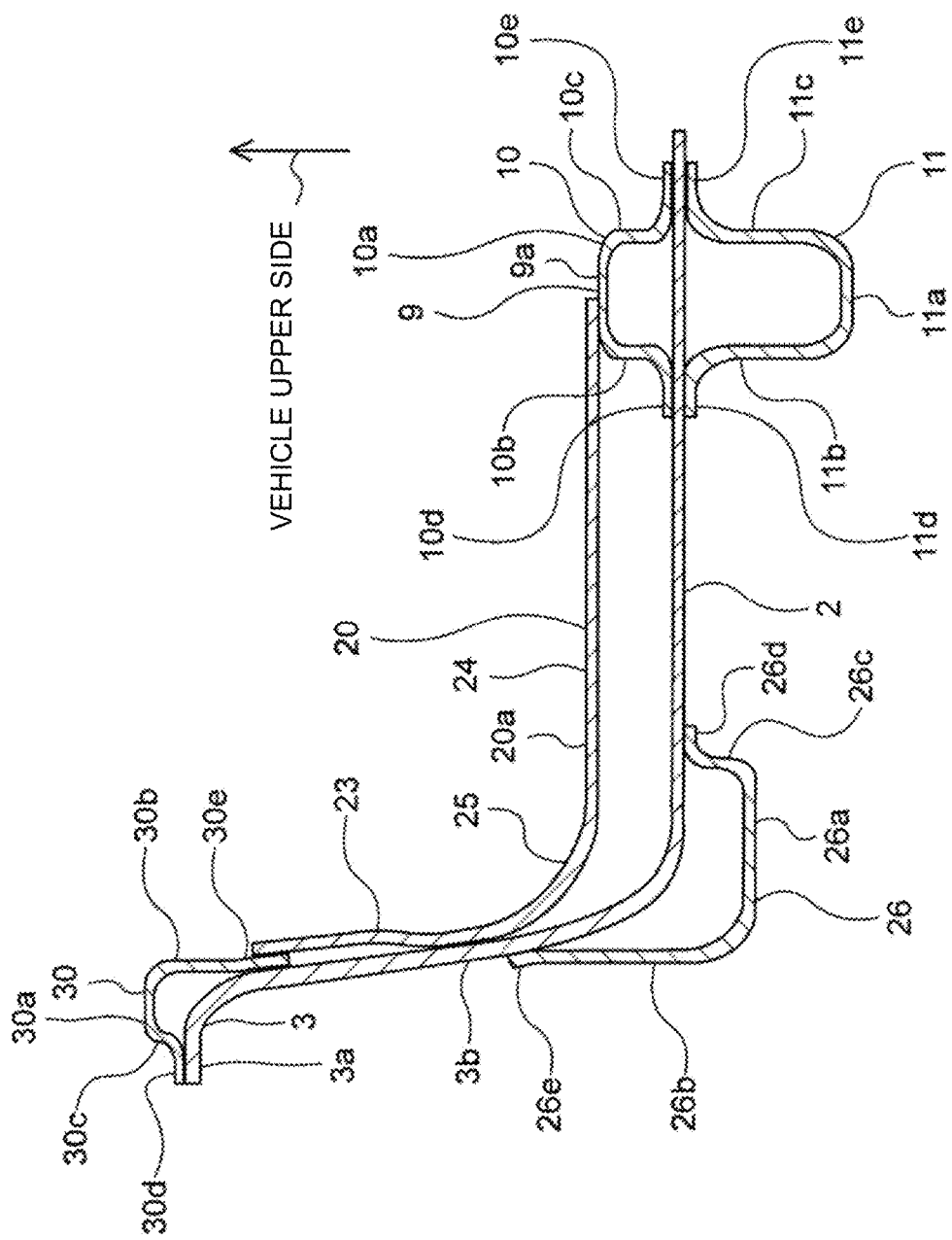
FIG. 3 is a schematic cross-sectional view of the lower vehicle-body structure seen from line III-III of FIG. 2 according to one embodiment of the present disclosure.

FIG. 3 is a schematic cross-sectional view of the lower vehicle-body structure seen from line III-III of FIG. 2. The frame member 9 includes an upper frame 10 joined to the upper face of the floor panel 2 by spot welding, for example, and a lower frame 11 joined to a lower face of the floor panel 2 by spot welding, for example. The upper frame 10 and the lower frame 11 are disposed so as to face each other across the floor panel 2. In the present embodiment, the inclined portion 9a is composed of the upper frame 10 and the lower frame 11. The rear-side extended portion 9b is composed of the lower frame 11.

The upper frames 10 are pressed components made of a steel material, for example, and are members each having a hat-like cross-sectional shape that opens downward in the cross-section illustrated in FIG. 3. The lower frames 11 are pressed components made of a steel material, for example, and are members each having a hat-like cross-sectional shape that opens upward in the cross-section illustrated in FIG. 3. Therefore, the upper frame 10 and the lower frame 11 form a substantially rectangular closed cross-section that is continuous along the vehicle front-rear direction such that the floor panel 2 is interposed therebetween.

The upper frame 10 has an upper face portion 10a that is disposed on the upper face side of the floor panel 2 and extends in parallel to the floor panel 2, an inner wall portion 10b that extends downward from an inner-side edge portion of the upper face portion 10a in the vehicle width direction, an outer wall portion 10c that extends downward from an outer-side edge portion of the upper face portion 10a in the vehicle width direction, an inner-side flange portion 10d that extends to the vehicle-width-direction inner side from a lower edge portion of the inner wall portion 10b, and an outer-side flange portion 10e that extends to the vehicle-width-direction outer side from a lower edge portion of the outer wall portion 10c.

The upper frame 10 is joined to the upper face of the floor panel 2 at the inner-side flange 10d and the outer-side flange 10e by spot welding, for example. As illustrated in FIG. 2, the inner-side flange 10d and the outer-side flange 10e are joined, at rear end portions, to the floor panel 2 together with the front-side flange 4a of the cross member 4 by spot welding, for example, such that three parts overlap each other. Therefore, the rear end portions of the inner-side flange 10d and the outer-side flange 10e constitute a connection portion according to some embodiments of the present disclosure.

As illustrated in FIG. 3, the lower frame 11 has a bottom face portion 11a that is disposed on the lower face side of the floor panel 2 and extends in parallel to the floor panel 2, an inner wall portion 11b that extends upward from an inner-side edge portion of the bottom face portion 11a in the vehicle width direction, an outer wall portion 11c that extends upward from an outer-side edge portion of the bottom face portion 1 lain the vehicle width direction, an inner-side flange portion 11d that extends to the vehicle-width-direction inner side from an upper edge portion of the inner wall portion 11b, and an outer-side flange portion 11e that extends to the vehicle-width-direction outer side from an upper edge portion of the outer wall portion 11c.

The lower frame 11 is joined to the upper face of the floor panel 2 at the inner-side flange 11d and the outer-side flange 11e by spot welding, for example. The outer-side flange 11e is provided in correspondence to the inclined portion 9a and is not provided on the rear-side extended portion 9b. The rear-side extended portion 9b is joined to an inner wall face of the side sill 51 at the outer wall portion 11c.

In the present embodiment, in the upper frame 10 and the lower frame 11, the flanges 10d, 10e and the flanges 11d, 11e thereof are spot-welded to each other, for example, with the interposition of the floor panel 2 therebetween such that three parts overlap each other (the welding points of the spot welding are indicated by "x" marks). Therefore, the upper frame 10 and the lower frame 11 are mounted on the floor panel 2 so as to form a substantially rectangular closed cross-section that is continuous along the vehicle front-rear direction such that the floor panel 2 is interposed therebetween, which constitutes the inclined portion 9a of the frame member 9.

Figure 4:
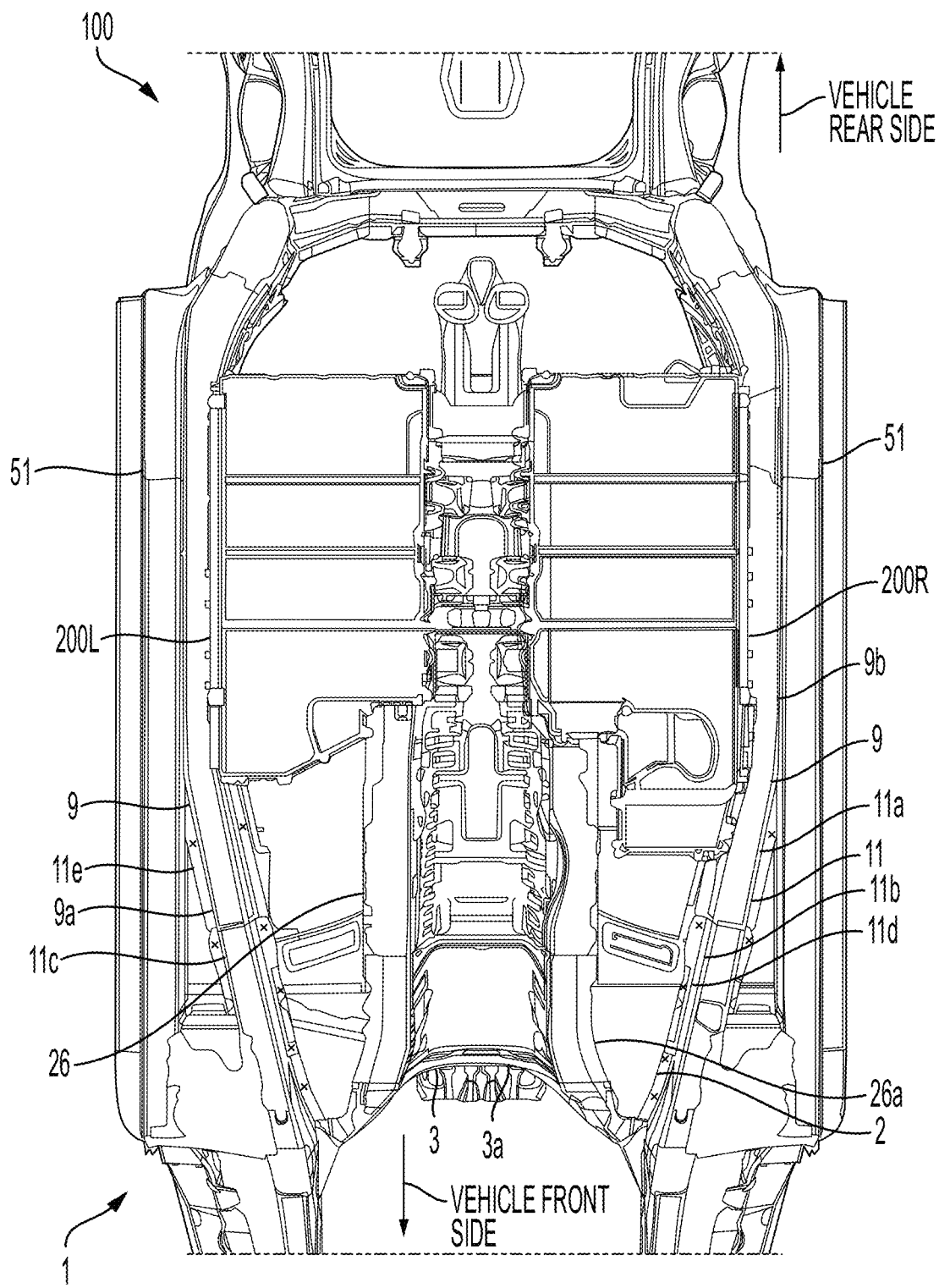
FIG. 4 is a schematic view of the lower vehicle-body structure in FIG. 1 seen from below according to one embodiment of the present disclosure.

FIG. 4 is a schematic view of the lower vehicle-body structure 1 in FIG. 1 seen from below. As illustrated in FIG. 4, on the lower face of the floor panel 2, each of a pair of batteries 200R, 200L is disposed between each of the pair of lower frames 11 (mainly the rear-side extended portions 9b) on both of the left and right sides in vehicle width direction and the tunnel portion 3. The pair of batteries 200R, 200L is electrically connected to a motor (not shown) installed in the abovementioned vehicle 100 and is adjacent to the lower frame 11 on the vehicle-width-direction inner side of the lower frame 11.

Returning to FIG. 2, on the upper face of the floor panel 2, coupling members 20 that each couple the upper frame 10 of the inclined portion 9a and the raised wall portion 3b of the tunnel portion 3 to each other in the vehicle width direction are disposed on both sides of the tunnel portion 3 in the vehicle width direction. The coupling members 20 are positioned on the vehicle front side of the cross members 4. The pair of coupling members 20 positioned on both sides of the tunnel portion 3 is substantially bilaterally symmetrical to each other when seen from the vehicle upper side.

With reference to FIG. 1 as well, each of the coupling members 20 has a rising portion 23 that extends in the up-down direction along the raised wall portion 3b of the tunnel portion 3, a horizontal portion 24 that extends in the vehicle width direction along the floor panel 2, and a slope portion 25 that connects the rising portion 23 and the horizontal portion 24 to each other.

The horizontal portion 24 extends in a direction inclined rearward toward the vehicle-width-direction inner side. Specifically, in top view, the horizontal portion 24 extends in a direction that is substantially orthogonal to a direction in which the upper frame 10 extends.

The coupling member 20 is a pressed component made of a steel material, for example, and has a cross-sectional shape orthogonal to the extending direction that is formed in a hat-like shape that opens downward or to the vehicle-width-direction inner side. Specifically, the coupling member 20 is formed to have a hat-like cross-sectional shape that opens to the vehicle-width-direction inner side in the rising portion 23, is formed to have a hat-like cross-sectional shape that opens downward in the horizontal portion 24, and is formed to have a hat-like cross-sectional shape that opens in a direction inclined downward toward the vehicle-width-direction inner side in the slope portion 25.

More specifically, the coupling member 20 has a top face portion 20a that extends to be substantially parallel to the floor panel 2 and the raised wall portion 3b of the tunnel portion 3, a front face portion 20b that extends downward and to the vehicle-width-direction inner side from a front edge portion of the top face portion 20a, a rear face portion 20c that extends downward or to the vehicle-width-direction inner side from a rear edge portion of the top face portion 20a, a front-side flange 20d that extends to the vehicle front side from an edge portion on a side of the front face portion 20b opposite from the top face portion 20a, and a rear-side flange 20e that extends to the vehicle rear side from an edge portion of the rear face portion 20c on a side opposite from the top face portion 20a.

In the coupling member 20, the front-side flange 20d and the rear-side flange 20e are joined to the floor panel 2 from upper faces by spot welding at the horizontal portion 24. The coupling member 20 is joined to the upper frame 10 at an outer-side end portion of the horizontal portion 24 in the vehicle width direction. Specifically, in the horizontal portion 24, at an outer-side end portion thereof in the vehicle width direction, the top face portion 20a is joined to the upper face portion 10a of the upper frame 10 from above by spot welding, for example, and the front-side flange 20d and the rear-side flange 20e are joined to the floor panel 2 from above by spot welding, for example, with the interposition of the inner-side flange 10d of the upper frame 10 therebetween such that three parts overlap each other.

Meanwhile, the coupling member 20 is joined to the tunnel portion 3 at the rising portion 23. Specifically, in the rising portion 23, the front-side flange 20d and the rear-side flange 20e are joined to the raised wall portion 3b of the tunnel portion 3 from the vehicle-width-direction outer side by spot welding, for example.

As illustrated in FIG. 3, the rising portion 23 is joined, at a lower end portion, to the raised wall portion 3b of the tunnel portion 3 together with an upper-side flange 26e of a tunnel side frame 26 described below by spot welding, for example, such that three parts overlap each other. The rising portion 23 is joined, at an upper end portion, to the raised wall portion 3b of the tunnel portion 3 from the vehicle-width-direction outer side by spot welding, for example, with the interposition of a lower-side flange 30e of a backbone frame 30 described below therebetween such that three parts overlap each other.

Meanwhile, the slope portion 25 extends in a direction inclined upward toward the vehicle-width-direction inner side. The slope portion 25 is spaced apart from the floor panel 2 to the upper side and is spaced apart from the tunnel portion 3 to the vehicle-width-direction outer side. In other words, the coupling member 20 is joined to neither the floor panel 2 nor the tunnel portion 3 in the slope portion 25.

Figure 5:
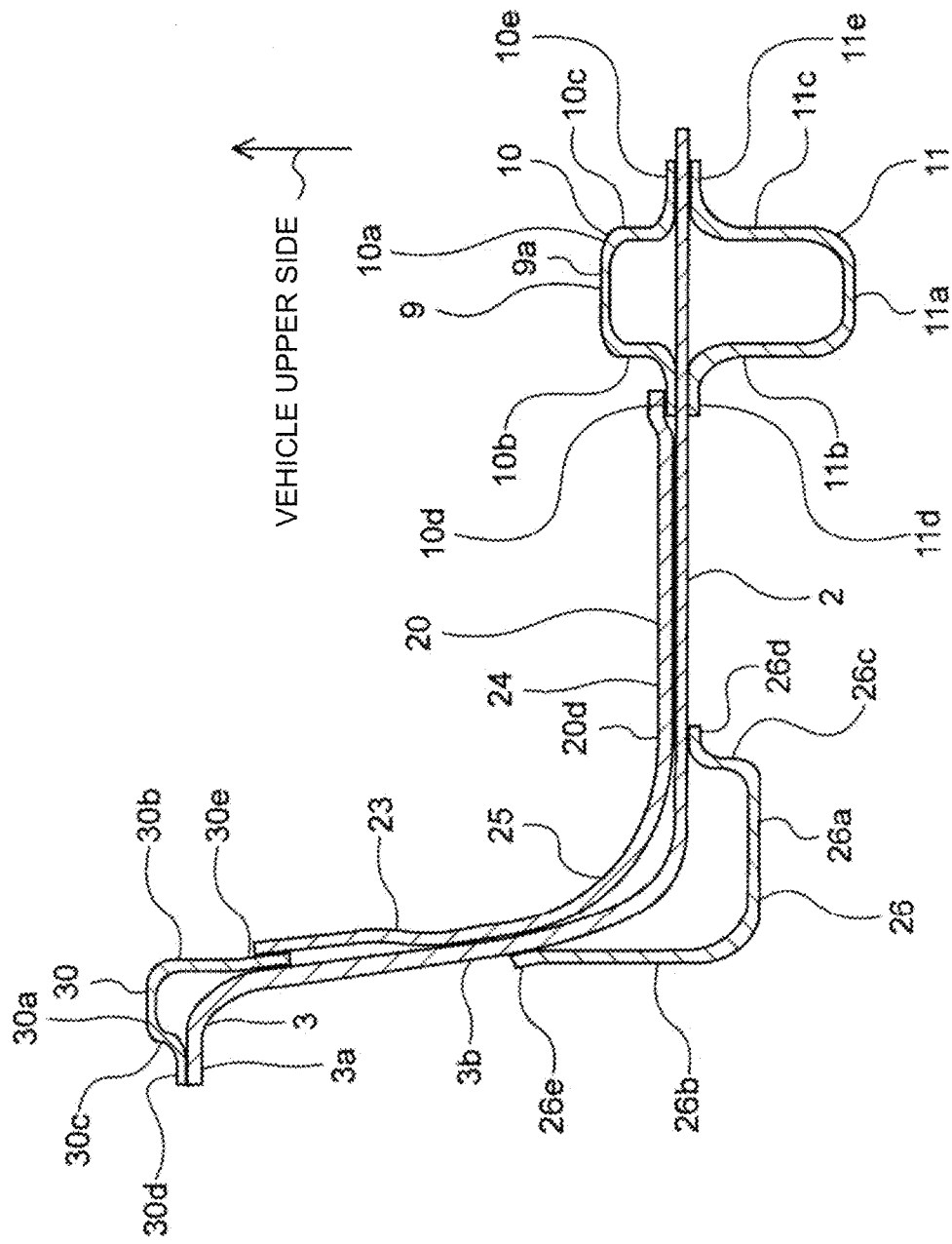
FIG. 5 is a schematic cross-sectional view of the lower vehicle-body structure seen from line V-V of FIG. 2 according to one embodiment of the present disclosure.

FIG. 5 is a schematic cross-sectional view of the lower vehicle-body structure 1 seen from line V-V of FIG. 2. As illustrated in FIG. 5, the tunnel side frame 26 that extends in the vehicle front-rear direction is disposed below the floor panel 2 and on the vehicle-width-direction inner side of the raised wall portion 3b.

The tunnel side frame 26 is a pressed component made of a steel material, for example, and is formed to have a substantially L-like cross-sectional shape having a bottom face portion 26a that extends in the horizontal direction at a position spaced apart from the floor panel 2 to the lower side, and a raised wall portion 26b that extends upward from an inner-side edge portion of the bottom face portion 26a in the vehicle width direction in the cross-section illustrated in FIG. 5. The tunnel side frame 26 further has an outer-side flange 26d that extends to the vehicle-width-direction outer side via an inclined portion 26c that extends to the outer side in the vehicle width direction toward the upper side from an outer-side edge portion of the bottom face portion 26a in the vehicle width direction. The tunnel side frame 26 has an upper-side flange 26e that extends in a direction inclined to the vehicle-width-direction inner side toward the upper side from an upper edge portion of the raised wall portion 26b.

The tunnel side frame 26 is joined, at the outer-side flange 26d, to the floor panel 2 from below by spot welding, for example, and is joined, at the upper-side flange 26e, to the raised wall portion 3b of the tunnel portion 3 from the vehicle-width-direction inner side by spot welding, for example.

In the tunnel side frame 26, the outer-side flange 26d is joined, at a position corresponding to the coupling member 20 in the vehicle front-rear direction, to the front-side flange 20d and the rear-side flange 20e of the coupling member 20 in the up-down direction by spot welding, for example, with the interposition of the floor panel 2 therebetween such that three parts overlap each other. In the tunnel side frame 26, the upper-side flange 26e is joined, at a position corresponding to the coupling member 20 in the vehicle front-rear direction, to the front-side flange 20d and the rear-side flange 20e of the coupling member 20 in the vehicle width direction by spot welding, for example, with the interposition of the raised wall portion 3b of the tunnel portion 3 therebetween such that three parts overlap each other.

Therefore, the tunnel side frame 26 is mounted on the floor panel 2 and the raised wall portion 3b so as to form a substantially L-like closed cross-section that is continuous along the vehicle front-rear direction between the floor panel 2 and the raised wall portion 3b.

Returning to FIG. 1, each of the backbone frames 30 that extends in the vehicle front-rear direction is disposed between the upper face portion 3a and each of the pair of left and right raised wall portions 3b of the tunnel portion 3.

As illustrated in FIG. 5, the backbone frame 30 is a pressed component made of a steel material, for example, and is formed to have a substantially L-like cross-sectional shape having an upper face portion 30a that extends in the horizontal direction in a position spaced apart from the upper face portion 3a of the tunnel portion 3 to the upper side, and a raised wall portion 30b that extends downward from an outer-side edge portion of the upper face portion 30a in the vehicle width direction in the cross-section illustrated in FIG. 5. The backbone frame 30 further has an inner-side flange 30d that extends to the vehicle-width-direction inner side via an inclined portion 30c that extends in a direction inclined inward in the vehicle width direction toward the lower side from an inner-side edge portion of the upper face portion 30a in the vehicle width direction. The backbone frame 30 has a lower-side flange 30e that extends in a direction inclined to the vehicle-width-direction outer side toward the lower side from a lower edge portion of the raised wall portion 30b.

The backbone frame 30 is joined, at the inner-side flange 30d, to the upper face portion 3a of the tunnel portion 3 from above by spot welding, for example, and is joined, at the lower-side flange 30e, to an upper portion of the raised wall portion 3b of the tunnel portion 3 from the vehicle-width-direction outer side by spot welding, for example.

In the backbone frame 30, the lower-side flange 30e is joined, at a position corresponding to the coupling member 20 in the vehicle front-rear direction, to the raised wall portion 3b of the tunnel portion 3 in the vehicle width direction together with the front-side flange 20d and the rear-side flange 20e of the coupling member 20. More specifically, the lower-side flange 30e of the backbone frame 30 is joined, by spot welding, for example, in a state of being interposed between the raised wall portion 3b of the tunnel portion 3 and the coupling member 20 such that three parts overlap each other.

Therefore, the backbone frame 30 is mounted on the upper face portion 3a and the raised wall portion 3b so as to configure a substantially L-like closed cross-section that is continuous along the vehicle front-rear direction between the tunnel portion 3, in particular, the upper face portion 3a and the upper portion of the raised wall portion 3b.

Figure 6:
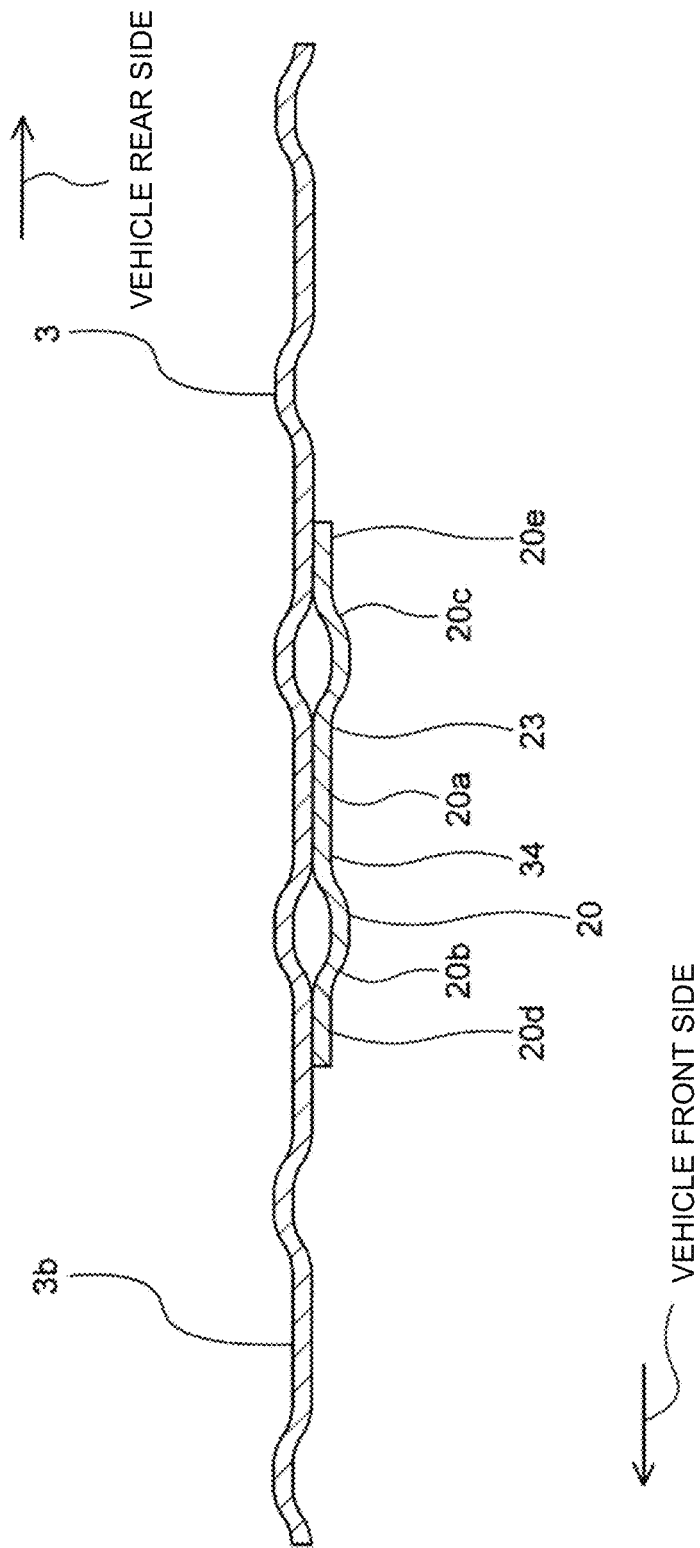
FIG. 6 is a schematic cross-sectional view of the lower vehicle-body structure seen from line VI-VI of FIG. 1 according to one embodiment of the present disclosure.

FIG. 6 is a schematic cross-sectional view of the lower vehicle-body structure 1 in the horizontal direction of the rising portion 23 of the coupling member 20 seen from line VI-VI of FIG. 1. As illustrated in FIG. 6, in the rising portion 23 of the coupling member 20, one bead 34 that extends in the up-down direction is provided in a recessed manner so as to be depressed to the vehicle-width-direction inner side. In other words, the rising portion 23 has a horizontal-direction cross-sectional shape that is formed in a substantially W-like shape as a result of providing one bead 34 in a top face portion of the rising portion 23 of the hat-like cross-sectional shape in a recessed manner.

The bead 34 extends in the up-down direction across substantially the entirety of the rising portion 23 of the coupling member 20. Specifically, the bead 34 extends downward from an upper end portion of the rising portion 23 and has a lower end portion that reaches a place directly above the slope portion 25. The coupling member 20 is also joined to the tunnel portion 3 at the bead 34. At an upper end portion of the bead 34, the coupling member 20 is joined to the raised wall portion 3b of the tunnel portion 3 from the vehicle-width-direction outer side by spot welding with the interposition of the lower-side flange 30e of the backbone frame 30 therebetween such that three parts overlap each other. At a place of the bead 34 that is below the backbone frame 30, the coupling member 20 is joined to the raised wall portion 3b of the tunnel portion 3 from the vehicle-width-direction outer side by spot welding, for example.

Returning to FIG. 2, the pair of front frames 41 that extends to the vehicle front side in a straight manner is connected to front ends of the pair of frame members 9 via the dash panel 40.

Figure 7:
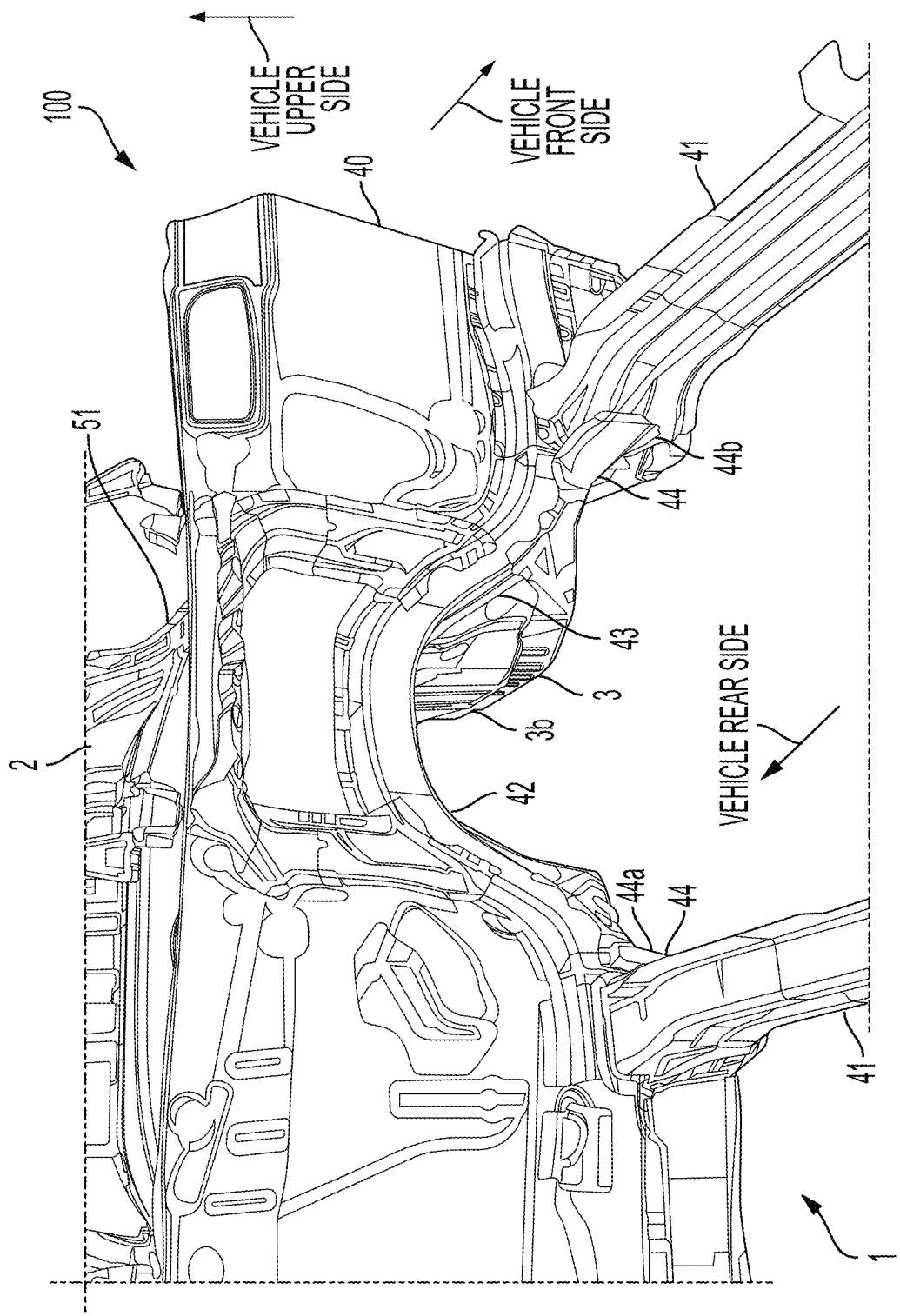
FIG. 7 is a schematic view of the lower vehicle-body structure in FIG. 1 seen from the front side of the vehicle according to one embodiment of the present disclosure.

FIG. 7 is a schematic view of the lower vehicle-body structure 1 in FIG. 1 seen from the front side of the vehicle. As illustrated in FIG. 7, a dash cross member 43 is disposed below the dash panel 40 disposed on the front end of the floor panel 2. The dash cross member 43 extends in the vehicle width direction and has, in the vehicle-width-direction center, a curved portion 42 that protrudes upward along the shape of the tunnel portion 3 provided on the floor panel 2.

On each of the vehicle-width-direction inner sides of rear end portions of the pair of front frames 41, a reinforcement member 44 that couples the front frame 41 and the dash cross member 43 to each other is disposed.

The reinforcement member 44 is a pressed component made of steel material, for example, and has a body 44a that is formed in a substantially triangular shape in top view and extends in a direction inclined to the vehicle-width-direction inner side toward the vehicle rear side. Therefore, by the reinforcement member 44, the rear end portion of the front frame 41 is coupled to the dash cross member 43 in a bracing form.

The body 44a has a cross-sectional shape orthogonal to the extending direction that is formed in a hat-like shape that opens to the vehicle-width-direction outer side. The reinforcement member 44 has a peripheral flange 44b formed along the whole circumference of a peripheral portion of the body 44a. The reinforcement member 44 is joined, at the peripheral flange 44b, to a vehicle-width-direction inner wall face of the front frame 41 and a front face of the dash cross member 43 by spot welding, for example.

As above, in the lower vehicle-body structure 1 according to the present embodiment, the coupling members 20 are disposed on the upper face of the floor panel 2. The coupling members 20 are disposed on the vehicle front side of the connection portions at which the pair of frame members 9 is connected to the pair of cross members 4 and couple the inclined portions 9a (upper frames 10) of the frame members 9 and the raised wall portions 3b of the tunnel portions 3 to each other in the vehicle width direction.

Each of the frame members 9 has the inclined portion 9a (upper frame 10) that is inclined toward the vehicle-width-direction outer side as the inclined portion 9a approaches the vehicle rear side. Therefore, at the time of an offset collision in which a collision load is input to a position offset from the central portion in the vehicle width direction from the vehicle front side, the collision load is transmitted to the frame member 9 via the front frame 41, but an inward falling deformation in which the inclined portion 9a of the frame member 9 falls toward the vehicle-width-direction inner side by pivoting about the connection portion connected to the cross member 4 easily occurs. However, in the present embodiment, the coupling member 20 that couples the inclined portion 9a (upper frame 10) of the frame member 9 and the raised wall portion 3b to each other in the vehicle width direction is included. Therefore, the coupling member 20 resists the abovementioned inward falling deformation in a supporting manner, and hence the inward falling deformation of the inclined portion 9a of the frame member 9 is suppressed.

The coupling member 20 extends in a direction orthogonal to the inclined portion 9a (upper frame 10) of the frame member 9. Therefore, it is easy for the coupling member 20 to exhibit a force that resists the inward falling deformation of the frame member 9 in a supporting manner in a more suitable manner.

The raised wall portion 3b is composed of the side portion of the tunnel portion 3 in the vehicle width direction in the central portion of the floor panel 2 in the vehicle width direction for the vehicle 100 including the tunnel portion 3 for covering the transmission and the like of the vehicle 100. Accordingly, the coupling member 20 couples the inclined portion 9a (upper frame 10) of the frame member 9 and the raised wall portion 3b to each other, which generates a force that resists the inward falling deformation of the frame member 9 in a supporting manner so that the inward falling deformation of the frame member 9 can be suppressed.

The raised wall portion 3b forms the closed cross-section with the tunnel side frame 26, and hence the rigidity of the raised wall portion 3b increases. Therefore, by coupling the raised wall portion 3b of which rigidity is increased and the inclined portion 9a (upper frame 10) of the frame member 9 to each other by the coupling member 20, a force that resists the inward falling deformation of the frame member 9 in a supporting manner can be exhibited in a more suitable manner.

The rising portion 23 of the coupling member 20 is coupled to the backbone frame 30 of the tunnel portion 3. By the rising portion 23 of the coupling member 20, the out-of-plane deformation in the side wall of the tunnel portion 3 is suppressed, and the rhombic deformation of the tunnel portion 3 in the vehicle width direction that occurs due to vibration at the time of vehicle traveling is suppressed.

The rising portion 23 of the coupling member 20 includes the bead 34 so as to have a substantially W-shaped cross section, and hence the rigidity thereof further increases. Therefore, by the rising portion 23 of the coupling member 20 of which rigidity is further increased, the out-of-plane deformation of the tunnel portion 3 can be suppressed even more.

The slope portion 25 acts in a bracing form between the floor panel 2 and the side portion of the tunnel portion 3, and hence the rhombic deformation of the tunnel portion 3 that occurs due to the vibration at the time of the vehicle traveling can be further suppressed.

The front frame 41 is connected to the front end of the frame member 9 having the inclined portion 9a (upper frame 10) that is inclined toward the vehicle-width-direction outer side as the inclined portion 9a approaches the vehicle rear side. Therefore, at the time of an offset collision in which the collision load is input to a position offset from the central portion in the vehicle width direction from the vehicle front side, an inward falling deformation in which the frame member 9 and the front frame 41 connected to the front end of the frame member 9 fall toward the vehicle-width-direction inner side by pivoting about the connection portion at which the frame member 9 is connected to the cross member 4 easily occurs. However, according to this configuration, the reinforcement member 44 couples the vehicle-width-direction inner side of the front frame 41 and the dash cross member 43 that extends in the vehicle width direction to each other. Therefore, the abovementioned inward falling deformation is easily resisted in a supporting manner, and the inward falling deformation of the front frame 41 and the frame member 9 is suppressed in an even easier manner.

In the present embodiment, in the rising portion 23 of the coupling member 20, one bead 34 that extends in the up-down direction is provided so as to be arranged side by side in the vehicle front-rear direction, but two or more beads may be provided so as to be arranged side by side in the vehicle front-rear direction, for example.

The present disclosure is not limited to the exemplified embodiment, and various improvements and changes in design can be made without departing from the gist of the present disclosure.

As above, according to some embodiments of the present disclosure, the inward falling deformation of the frame member may be easily suppressed in the lower vehicle-body structure of the vehicle. Therefore, the present disclosure can be suitably used in a vehicle in which the lower vehicle-body structure is installed.

Finally, it should be noted that the above embodiments/examples are only used to illustrate the technical features of the present disclosure, not to limit them; although the present disclosure has been described in detail with reference to the foregoing embodiments and examples, those of ordinary skill in the art should understand that: the technical features disclosed in the foregoing embodiments and examples can still be modified, some or all of the technical features can be equivalently replaced, but, these modifications or replacements do not deviate from the spirit and scope of the disclosure.

REFERENCE SIGNS LIST

1 Lower vehicle-body structure
2 Floor panel

4 Cross member
3b Raised wall portion
9 Frame member
9a Inclined portion
20 Coupling member
100 Vehicle

The invention claimed is:

1. A lower vehicle-body structure of a vehicle, the lower vehicle-body structure characterized by comprising:
   a floor panel configured as a floor of the vehicle;
   a raised wall portion that is disposed in vicinity of a central portion of the floor panel in a vehicle width direction and provided in a protruding manner along a vehicle front-rear direction;
   a cross member that is disposed on an upper face of the floor panel, extends in the vehicle width direction, and is joined to the raised wall portion;
   a frame member including:
      an inclined portion that is disposed so as to form a closed cross-section with the floor panel on a vehicle-width-direction outer side of the raised wall portion on the upper face of the floor panel, the inclined portion being inclined toward the vehicle-width-direction outer side as the inclined portion approaches a vehicle rear side; and
      a connector connected to the cross member at a rear end of the inclined portion; and
   a coupler that is disposed on the floor panel at a place on a vehicle front side of the connector and couples the inclined portion and the raised wall portion to each other in the vehicle width direction.

2. The lower vehicle-body structure of the vehicle according to claim 1, characterized in that:
   a tunnel portion that protrudes toward an upper side of the vehicle is disposed on the central portion of the floor panel in the vehicle width direction; and
   the raised wall portion is composed of a side portion of the tunnel portion in the vehicle width direction.

3. The lower vehicle-body structure of the vehicle according to claim 1, characterized in that:
   a front frame that extends to the vehicle front side is connected to a front end of the inclined portion of the frame member;
   a dash cross member that extends in the vehicle width direction is disposed on a front end of the floor panel; and
   a reinforcement member that couples the front frame and the dash cross member to each other is disposed on a rear end of the front frame on a vehicle-width-direction inner side of the rear end.

4. A vehicle comprising the lower vehicle-body structure of the vehicle according to claim 1.

5. The lower vehicle-body structure of the vehicle according to claim 1, characterized in that the cross member extends continuously in the vehicle width direction from the frame member to the raised wall portion.

6. A lower vehicle-body structure of a vehicle, the lower vehicle-body structure characterized by comprising:
   a floor panel configured as a floor of the vehicle;
   a raised wall portion that is disposed in vicinity of a central portion of the floor panel in a vehicle width direction and provided in a protruding manner along a vehicle front-rear direction;
   a cross member that is disposed on an upper face of the floor panel and extends in the vehicle width direction;
   a frame member including:
      an inclined portion that is disposed so as to form a closed cross-section with the floor panel on a vehicle-width-direction outer side of the raised wall portion on the upper face of the floor panel, the inclined portion being inclined toward the vehicle-width-direction outer side as the inclined portion approaches a vehicle rear side; and
      a connector connected to the cross member at a rear end of the inclined portion; and
   a coupler that is disposed on the floor panel at a place on a vehicle front side of the connector and couples the inclined portion and the raised wall portion to each other in the vehicle width direction,
   wherein the coupler extends in a direction orthogonal to an extending direction of the inclined portion of the frame member when seen from an upper face of the vehicle.

7. The lower vehicle-body structure of the vehicle according to claim 6, characterized in that:
   a tunnel portion that protrudes toward an upper side of the vehicle is disposed on the central portion of the floor panel in the vehicle width direction; and
   the raised wall portion is composed of a side portion of the tunnel portion in the vehicle width direction.

8. The lower vehicle-body structure of the vehicle according to claim 7, characterized in that a tunnel side frame that forms a closed cross-section with the raised wall portion and the floor panel and extends in the vehicle front-rear direction is disposed on the side portion of the tunnel portion in the vehicle width direction.

9. The lower vehicle-body structure of the vehicle according to claim 8, characterized in that:
   a backbone frame that extends in the vehicle front-rear direction is disposed on an upper portion of the tunnel portion on a vehicle-width-direction end portion side of the tunnel portion;
   a rising portion that extends upward is provided on the coupler on the vehicle-width-direction inner side of the coupler; and
   the rising portion is coupled to the backbone frame.

10. The lower vehicle-body structure of the vehicle according to claim 9, characterized in that at least one bead that extends in an up-down direction is provided in the rising portion of the coupler.

11. The lower vehicle-body structure of the vehicle according to claim 10, characterized in that:
   at least two of the beads is provided in the rising portion of the coupler; and
   the rising portion has a horizontal-direction cross-sectional shape that is formed in a substantially W-like shape by the at least two beads.

12. The lower vehicle-body structure of the vehicle according to claim 11, characterized in that the coupler includes:
   a horizontal portion that is disposed on the upper face of the floor panel and extends in the vehicle width direction; and
   a slope portion that extends in a direction that is inclined upward as the slope portion approaches the vehicle-width-direction inner side between the rising portion and the horizontal portion.

13. The lower vehicle-body structure of the vehicle according to claim 12, characterized in that:
   a front frame that extends to the vehicle front side is connected to a front end of the inclined portion of the frame member;

a dash cross member that extends in the vehicle width direction is disposed on a front end of the floor panel; and a reinforcement member that couples the front frame and the dash cross member to each other is disposed on a rear end of the front frame on a vehicle-width-direction inner side of the rear end.

14. A vehicle comprising the lower vehicle-body structure of the vehicle according to claim 13.

* * * * *